United States Patent [19]

Takagi et al.

[11] 3,912,519
[45] Oct. 14, 1975

[54] ANTI-FOULING SHIP BOTTOM PAINT

[75] Inventors: Isamu Takagi, Amagasaki; Seishi Kawanishi, Takarazuka; Yoshihiko Nishizawa, Nara, all of Japan

[73] Assignee: Sumitomo Chemical Company, Limited, Osaka, Japan

[22] Filed: Jan. 29, 1974

[21] Appl. No.: 437,630

[30] Foreign Application Priority Data
Feb. 1, 1973 Japan............... 48-13441

[52] U.S. Cl................ 106/15 AF; 106/16; 424/277
[51] Int. Cl.²... C09D 3/40; C09D 5/14; C09D 5/16; C09D 5/18
[58] Field of Search............ 106/15 AF, 16–18; 71/67, 90; 260/465 F, 465 H; 424/277

[56] References Cited
UNITED STATES PATENTS

| | | | |
|---|---|---|---|
| 2,683,659 | 7/1954 | Schlesinger et al. | 260/465 F |
| 3,250,798 | 5/1966 | Shulgin | 71/105 X |
| 3,575,123 | 4/1971 | Shepherd et al. | 106/15 AF X |
| 3,824,318 | 6/1974 | Shema et al. | 71/67 X |

OTHER PUBLICATIONS
"The Agricultural and Food Chemistry," Vol. 12, No. 3, 251-253 (1964).
"The Agricultural and Biological Chemistry," Vol. 35, No. 13, 2003-2007 (1971).

*Primary Examiner*—Joan E. Welcome
*Attorney, Agent, or Firm*—Stevens, Davis, Miller & Mosher

[57] ABSTRACT

An anti-fouling ship bottom paint comprising as an active ingredient 1. 5-chloro-4-phenyl-1,2-dithiol-3-one (referred to as Compound A) having the formula,

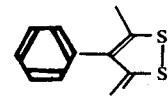

or 2. a mixture of the compound A and 3,5-di-lower alkyl-4-hydroxy-benzylidene malononitrile represented by the formula,

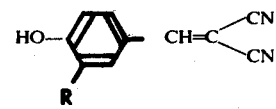

wherein R is a $C_1$-$C_5$ alkyl group, which is useful for the purpose of protecting outer surface of a hull from attachment of marine lives such as green algae, barnacles, tube worms and the like.

7 Claims, No Drawings

ANTI-FOULING SHIP BOTTOM PAINT

The present invention relates to an antifouling ship bottom paint characterized in that said paint contains 1. 5-chloro-4-phenyl-1,2-dithiol-3-one represented by the formula (hereinafter referred to as Compound A) as an anti-fouling active ingredient for ship bottom paint,

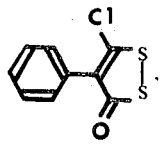

or 2. a mixture of the compound A and 3,5-di-lower alkyl-4-hydroxy-benzylidene malononitrile represented by the formula (hereinafter referred to as Compound B) as the active ingredient.

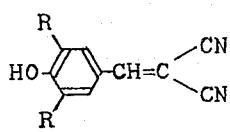

wherein R is a $C_1$-$C_5$ alkyl group, for the purpose of protecting the outer surface of hull from the attachment of marine lives such as green algae, barnacles, tube worms and the like. The paint compositions of the present invention, which contain paint resins, pigments, organic solvents, various additives which are used for conventional paint, an inert components, and said active ingredients, are very remarkably effective, when applied onto the outer surface of hull, for preventing the attachment of marine lives such as green algae, barnacles, tube worms, slimes, cladophora and the like, which cause the reduction in the speed of ship.

As to the anti-fouling active ingredients of the present invention, the application of the Compound A to agriculture, horticulture, leather and paper as a bactericide and/or a fungicide is wellknown in Japanese Pat. No. 12,519/1966 and "The Agricultural and Food Chemistry", Vol. 12, No. 3, 251–253 (1964). On the other hand, the use of the Compound B as agricultural and sanitary insecticides and fungicides is also disclosed in Japanese Pat. Nos. 17,155/1969 and 1,840/1970 previously applied by the present inventors and "The Agricultural and Biological Chemistry", Vol. 35, No. 13, 2003–2007 (1971). However, the use of the two compounds as an anti-fouling agent for ship bottom paint which is an object of the present invention has never been known in any literature. Furthermore, it will clearly be shown from the following description that the compounds which have an insecticidal and/or fungicidal activity in the fields of agriculture, horticulture and industry do not always show the superior anti-fouling effect, unlike the present anti-fouling active ingredients, in the field of ship bottom paint.

That is, it was found that the ship bottom paints incorporated with the following typical agricultural and sanitary insecticides and/or fungicides, for example, O,O-di-isopropyl-S-benzylphosphorothiolate, 0-ethyl-S,S-diphenyldithiophosphate, 2-(1-methylheptyl)-4,6-dinitrophenylcarbamate, O,O-dimethyl-0-methyl-4-nitrophenylphosphorothioate, pentachloronitrobenzene and methyl-1-(butylcarbamoyl)-2-benzimidazole carbamate, did not show any effect of preventing the attachment of marine lives. The insecticides such as BHC and DDT showed the anti-fouling effect against barnacles and tube worms to some extent, but little or no effect against green algae and slimes, and so they are not satisfactory as an anti-fouling agent for ship bottom paint, when applied singly. The Compound A of the present anti-fouling agents, however, shows an excellent effect of preventing the attachment of various marine lives even when used singly, and its effect is much more enhanced when used in combination with the Compound B.

The conventional anti-fouling agents used with ship bottom paint include inorganic heavy-metal compounds such as mercury and copper compounds, and various types of organic and organo-metallic compounds. However, the inorganic metal compounds lose their anti-fouling activity rapidly in the sea contaminated with hydrogen sulfide. Many of the organic anti-fouling agents are effective for preventing the attachment of particular marine lives, however are little effective against other marine lives. Among the inorganic and organic compounds, there are many compounds which are not suitable for practical use because of their toxicity to human body, in spite of the high effect of preventing the attachment of marine lives. Furthermore, the conventional anti-fouling paints have the defect that a large amount of the agent should be incorporated therein, for example as much as about 30 to about 60% by weight with the inorganic anti-fouling agents such as cuprous oxide, and about 20 to about 40% by weight even with the mixed anti-fouling agents of the organic and inorganic compounds, otherwise a long-term persistence of the effects becomes very low. Regarding the long-term persistence, the conventional guaranteed term is one year after coating of ships, after which recoating is ordinarily carried out in a dock, however the term is recently required to be prolonged to two years for the purpose of increasing a transportation efficiency. For satisfying such requirement for the conventional agents, it is necessary to incorporate a greater amount of the agent, and therefore the ship bottom paints including agents with a more superior anti-fouling activity have been expected to be developed.

The inventors have extensively studied an improvement of such defective conventional anti-fouling ship bottom paints as mentioned above, and found that the defects could be removed by using as the active ingredient 5-chloro-4-phenyl-1,2-dithiol-3-one (Compound A) or a mixture of the Compound A and 3,5-di-lower alkyl-4-hydroxy-benzylidene malononitrile (Compound B), and completed the present invention.

The anti-fouling paint of the present invention contains, as an essential anti-fouling active ingredient, the Compound A or a mixture of the Compounds A and B, shows a very outstanding effect for protecting the outer surface of hull from the attachmemnt of various marine lives even if the content of agent is much lower than that of the conventional paints, has an excellent long-term persistance, and at the same time has no adverse effect on coating operations owing to the low toxicity of the agents to human body and no danger of contaminating sea water with poisonous materials. In other words, the present anti-fouling paints have remarkable advantages in terms of anti-fouling activity, economics and toxicity, and the ratio of Compound A to Compound B is preferably 2 : 1 to 1 : 2.

The essential active ingredient of the present paints is 5-chloro-4-phenyl-1,2-dithiol-3-one (Compound A) or a mixture of the Compound A and the Compound of the formula (Compound B),

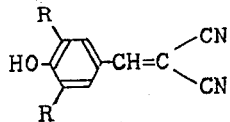

wherein R is a $C_1$-$C_5$ alkyl group. The substituent R of the Compound B is a $C_1$-$C_5$ alkyl group and preferably tert.-butyl and amyl groups. The content of said ingredient in paint can arbitrarily be varied without any limitation depending on coating performance and paint cost required, in either the system of Compound A alone or the mixture of the Compounds A and B. The content of said ingredient in the paint, however, is usually below about 20% by weight, and preferably about 5 to about 15% by weight even at which a satisfactory effect can be obtained. The content can be much more reduced in case of the combined system with the conventional anti-fouling agents.

As for the toxicity of the compounds A and/or B, they have such a high rate of decomposition that they have no residual toxicity and cause no environmental pollution. The compound A alone is sufficient, as an anti-fouling active ingredient, to attain the object of the present invention, however the use of the mixture of Compounds A and B as the ingredient ensures the persistence for a much longer period of time in preventing the attachment of a wider range of marine lives.

The anti-fouling paints of the present invention may be formulated with the conventional anti-fouling agents used for ship bottom paints as the other component in addition to the essential anti-fouling agents above-mentioned. Thus, the paints can ensure a much more balanced effect for preventing the attachment of various marine lives, without causing any adverse effect of mixing and a decrease of the effect of the essential agents. The conventional agents include inorganic compounds such as cuprous oxide and mercuric oxide; organic compounds or organometallic compounds such as tributyl tin chloride, triphenyl tin hydroxide, pentachlorophenol, pentachlorophenyl copper, tetramethylthiuramdisulfide, zinc dimethyldithiocarbamate, zinc ethylphenyldithiocarbamate, 2-cyclohexyl-4,6-dinitrophenol, 2,3,5,6-tetrachloro-1,4-benzoquinone, 2,2'-thio-bis-4,6-dinitrophenol, BHC, DDT, Endrin and Telodrin.

As the resins, which are inert components used for the anti-fouling paints of the present invention, the conventional paint resins can satisfactorily be used without any restriction, however oleoresinous resins, bituminous resins, polyolefins, polyvinylchlorides, chlorinated rubber resins, epoxy resins and tar epoxy resins are particularly preferred.

Furthermore, the anti-fouling paints of the present invention may contain, for the purpose of ensuring and increasing the effect, other inert components such as pigments for paint, for example colored pigments and extender pigments, various organic solvents of alcohol and ketone types and aromatic and aliphatic hydrocarbon types, plasticizers, plasticizer additives and fillers, which are used for any conventional paint.

The anti-fouling paints of the present invention can be prepared by formulating the resins, pigments, organic solvents, other additives and anti-fouling agents above-mentioned into a dispersion, according to the conventional methods using, for example, a pebblemill. The paints thus prepared can exhibit the longterm persistence superior to that of the conventional anti-fouling paints in preventing the attachment of marine lives, when applied onto the outer surface of hull according to various coating methods and coating systems.

The effect of the present invention will be illustrated with reference to the following examples, which are only given for the purpose of illustration and not to be interpreted as limiting.

EXAMPLES

The formulations of the present paints and the paints for control are as shown in Table 1.

Table 1

(Unit is parts by weight.)

| Component | Paint Exp. No. | Paints of the present invention | | | | | | Paints for control | | | |
|---|---|---|---|---|---|---|---|---|---|---|---|
| | | 1 | 2 | 3 | 4 | 5 | 6 | 7 | 8 | 9 | 10 |
| 5-chloro-4-phenyl-1,2-dithiol-3-one | | 10 | 5 | 2.5 | 5 | 5 | 5 | | | | |
| 3,5-di-tert.-butyl-4-hydroxybenzylidenemalononitrile | | | | 2.5 | | | | | | | |
| tetramethylthiuramdisulfide | | | | 10 | 10 | | 5 | | | 20 | |
| triphenyl tin hydroxide | | | | 2 | 2 | | 1 | | | | 20 |
| cuprous oxide | | | | | | 20 | 20 | 30 | 50 | | |
| red iron oxide | | 20 | 20 | 20 | 20 | 10 | 9 | 10 | | 20 | 20 |
| silica | | 10 | 10 | 3 | 3 | 5 | | 5 | | 5 | 5 |
| talc | | 10 | 15 | 10 | 10 | 10 | | 5 | | 5 | 5 |
| rosin | | 20 | 20 | 10 | 10 | 20 | 10 | 10 | 8 | 20 | 20 |
| boiled linseed oil-based resin | | 10 | 10 | | | 10 | | 10 | | 10 | 10 |
| chlorinated rubber resin | | | | 10 | 10 | | | | | | |
| polyvinylchloride resin | | | | | | | 10 | | 8 | | |
| tricresylphosphate | | | | 0.3 | 0.3 | | 0.3 | | 0.3 | | |
| naphtha | | 20 | 20 | 19.7 | 19.7 | 20 | | 20 | 16.7 | 20 | 20 |
| methyl isobutyl ketone | | | | | | | 20 | | | | |
| xylene | | | | 10 | 10 | | 19.7 | | 17 | | |
| total | | 100 | 100 | 100 | 100 | 100 | 100 | 100 | 100 | 100 | 100 |

Each of the anti-fouling paints which had been prepared by the conventional mixing and grinding in a pebble-mill according to the formulations abovementioned, was applied according to the coating systems in Table 2, to the both surfaces of a mild steel plate (300 mm × 300 mm × 3 mm) which had previously been treated with sandblast.

Table 2

| Coating system | Content of coating system (paint and number of coating) | Film thickness of each coating | Drying condition of each coating |
|---|---|---|---|
| A | one coating with a wash primer (commercial product) | 10 μ | 24 hrs, room temperature |
| | two coatings with an oil-based ship bottom paint No. 1 (commercial product) | 40 μ | same as above |
| | two coatings with the present paints or the paints for control | 40 μ | same as above |
| B | one coating with a wash primer (commercial product) | 10 μ | 24 hrs, room temperature |
| | two coatings with a chlorinated rubber-based ship bottom paint No. 1 (commercial product) | 40 μ | same as above |
| | two coatings with the present paints or the paints for control | 40 μ | same as above |
| C | one coating with a wash primer (commercial product) | 10 μ | 24 hrs, room temperature |
| | four coating with a polyvinylchloride-based ship bottom paint No. 1 (commercial product) | 30 μ | same as above |
| | two coatings with the present paints or the paints for control | 40 μ | same as above |

The test plates thus prepared were hung from a raft at the level of sea-surface and at the position of 1.5 m in depth from sea-surface in the marine laboratory at Toba City, Mie Prefecture, Japan for 1 year. The degrees of the attachment of marine lives after one year are as shown in Table 3. It can clearly be shown from the Table that the test plates coated with the present paints showed an outstandingly superior anti-fouling effect, compared with those coated with the paints for control.

Table 3

| Exp. No. | Coating system | Degree of the attachment of [1] marine lives | | | | |
|---|---|---|---|---|---|---|
| | | slimes | green algae | barnacles | tube worms | cladophora |
| 1 | A | − | − | − | − | − |
| 2 | A | − | − | − | − | − |
| 3 | B | − | − | − | − | − |
| 4 | B | − | − | − | − | − |
| 5 | A | − | − | − | − | − |
| 6 | C | − | − | − | − | − |
| 7 | A | ++ | +++ | + | + | + |
| 8 | C | ++ | ++ | − | − | − |
| 9 | A | ++ | ++ | ++ | ++ | ++ |
| 10 | A | ++ | + | − | − | − |
| blank [2] test | A | +++ | ++++ | ++++ | ++ | ++ |

Note: [1] The standard of judgement of attachment is as follows:
Symbol    Area covered with marine lives (%)
−         0
+         1-10
++        11-20
+++       21-50
++++      51-100

[2] The test plate for a blank test was prepared according to the coating system A (oleoresinous paint) except that the anti-fouling paint was not coated.

2. The test plate for a blank test was prepared according to the coating system A (oleoresinous paint) except that the anti-fouling paint was not coated.

What we claim is:

1. An anti-fouling ship bottom paint comprising as an anti-fouling active ingredient an effective amount of a mixture of a. 5-chloro-4-phenyl-1,2-dithiol-3-one of the formula

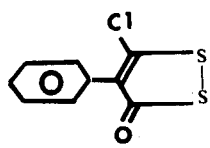

and b. a 3, 5-di-lower alkyl 4-hydroxy-ben-zylidene malononitrile of the formula

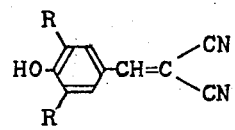

wherein R represents C, —C$_5$ alkyl, a resin and at least one inert component selected from the group consisting of pigments for paint, organic solvents, plasticizers, plasticizer additives and fillers.

2. An anti-fouling ship bottom paint according to claim 1, wherein R represents tertiary butyl or amyl.

3. An anti-fouling ship bottom paint according to claim 1, wherein the ratio of the Compound A to Compound B is 2 : 1 to 1 : 2.

4. A method for protecting the outer surface of hull from the attachment of marine lives which comprises applying the compositions of claim 1 onto the outer surface of hull.

5. An anti-fouling ship bottom paint according to claim 1, wherein the content of active ingredient in said paint is below about 20% by weight.

6. An anti-fouling ship bottom paint according to claim 5, wherein the content of active ingredient in said paint is about 5 to about 15% by weight.

7. A method according to claim 4, wherein marine lives are green algae, barnacles, tube worms, slimes and cladophora.

* * * * *